(12) United States Patent
Matsunaga

(10) Patent No.: US 8,493,458 B2
(45) Date of Patent: Jul. 23, 2013

(54) IMAGE CAPTURE APPARATUS AND IMAGE CAPTURING METHOD

(75) Inventor: Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 304 days.

(21) Appl. No.: 12/943,193

(22) Filed: Nov. 10, 2010

(65) Prior Publication Data

US 2011/0109767 A1 May 12, 2011

(30) Foreign Application Priority Data

Nov. 11, 2009 (JP) .............................. P2009-257822
Feb. 24, 2010 (JP) .............................. P2010-038233

(51) Int. Cl.
*H04N 5/225* (2006.01)
*H04N 5/228* (2006.01)
*H04N 9/73* (2006.01)

(52) U.S. Cl.
USPC ................... 348/218.1; 348/208.1; 348/223.1

(58) Field of Classification Search
USPC .......... 348/218.1, 208.1–208.6, 223.1–225.1, 348/370–371
See application file for complete search history.

(56) References Cited

U.S. PATENT DOCUMENTS

| 7,508,421 | B2 | 3/2009 | Tamaru et al. | |
| 7,590,344 | B2* | 9/2009 | Petschnigg | 396/155 |
| 7,756,354 | B2 | 7/2010 | Washisu | |
| 7,756,411 | B2 | 7/2010 | Tanaka et al. | |
| 7,903,896 | B2* | 3/2011 | Yamada | 382/254 |
| 7,986,853 | B2 | 7/2011 | Washisu | |
| 2004/0051790 | A1 | 3/2004 | Tamaru et al. | |
| 2004/0239779 | A1* | 12/2004 | Washisu | 348/239 |
| 2005/0201594 | A1* | 9/2005 | Mori et al. | 382/107 |
| 2006/0033817 | A1* | 2/2006 | Ishikawa et al. | 348/208.2 |
| 2007/0165960 | A1* | 7/2007 | Yamada | 382/254 |

(Continued)

FOREIGN PATENT DOCUMENTS

| JP | 2000-307941 A | 11/2000 |
| JP | 2000-308068 A | 11/2000 |

(Continued)

OTHER PUBLICATIONS

Japanese Office Action dated Nov. 22, 2011 (and English translation thereof) in counterpart Japanese Application No. 2010-038233.

(Continued)

*Primary Examiner* — Sinh Tran
*Assistant Examiner* — Christopher K Peterson
(74) *Attorney, Agent, or Firm* — Holtz, Holtz, Goodman & Chick, P.C.

(57) ABSTRACT

An image capture apparatus including: an image capturing unit; a light emitting unit; a first image capture controller configured to control the image capturing unit to capture a plurality of images at a first timing; a second image capture controller configured to control the image capturing unit to capture an image under a capturing condition illuminated by the light emitting unit at a second timing that is either directly before or directly after the first timing; an addition combination section configured to positionally align the images captured under control by the first image capture controller and to perform an addition combination on the aligned images to generate a combined image; and a combination section configured to combine the combined image generated by the addition combination section with the image captured under control by the second image capture controller.

7 Claims, 14 Drawing Sheets

U.S. PATENT DOCUMENTS

| | | |
|---|---|---|
| 2007/0230939 A1 | 10/2007 | Tanaka et al. |
| 2009/0021616 A1* | 1/2009 | Endo .............................. 348/294 |
| 2009/0219415 A1* | 9/2009 | Matsunaga et al. ............ 348/239 |
| 2009/0244301 A1* | 10/2009 | Border et al. ............. 348/208.99 |
| 2009/0309994 A1* | 12/2009 | Inoue ......................... 348/223.1 |
| 2010/0271498 A1* | 10/2010 | Hwang et al. ............... 348/222.1 |

FOREIGN PATENT DOCUMENTS

| | | |
|---|---|---|
| JP | 2004-032171 A | 1/2004 |
| JP | 2004-214836 A | 7/2004 |
| JP | 2004-357071 A | 12/2004 |
| JP | 2005-039365 A | 2/2005 |
| JP | 2005-86488 A | 3/2005 |
| JP | 2006-245847 A | 9/2006 |
| JP | 2007-288235 A | 11/2007 |
| JP | 2009-124264 A | 6/2009 |
| KR | 10-0819810 A | 4/2008 |

OTHER PUBLICATIONS

Korean Office Action mailed Dec. 28, 2012 (and English translation thereof), issued in counterpart Korean Application No. 10-2010-0111643.

\* cited by examiner

TONE CURVE SETTING DURING
DE-MOSAICING INDIVIDUAL IMAGES

IMAGE CAPTURE APPARATUS AND IMAGE CAPTURING METHOD

CROSS-REFERENCE TO THE RELATED APPLICATION(S)

The present application is based upon and claims priority from prior Japanese Patent Application No. 2009-257822, filed on Nov. 11, 2009, and from prior Japanese Patent Application No. 2010-038233, filed on Feb. 24, 2010, the entire content of which are incorporated herein by reference.

BACKGROUND

1. Field of the Invention

Embodiments described herein are related to an image capture apparatus, an image capturing method and a computer readable medium containing an image capture program.

2. Description of the Related Art

Various techniques have been proposed for capturing a scene of a night view and a main subject, such as a human subject, so as to enable an image to be stored in which both the night view and the main subject are distinct. For example, in the technique described in JP-A-2005-086488, flash-on image capture accompanied by flash emission and flash-off image capture not accompanied by a flash are successively performed. When doing so, the image capture sensitivity is set high during flash-off image capture so as to appropriately expose the night view.

The image obtained thereby with the flash-off image capture (the non-flash image) is an image having brightness appropriate for a night view even if the brightness of the main subject is inappropriate. The image obtained by the flash image capture (flash image) is an image having brightness appropriate for the main subject even though the brightness of the night view is inappropriate. Consequently, by combining the non-flash image with the flash image, an image can be stored in which both the night view and the main subject are distinct and both have appropriate respective brightness.

The image capture sensitivity is set high in the above technique during flash-off image capture in order for the night view to be appropriately exposed. Thermal noise is therefore generated in the image comprising the night view and main subject during flash-off image capture, namely in the non-flash image. However, the thermal noise generated in the main subject is corrected and eliminated by combination with the flash image.

Since there is, however, no correction for the thermal noise generated in regions outside of the main subject, a problem arises in that a poor quality image is still obtained with residual thermal noise.

SUMMARY

According to a first aspect of the present invention, there is provided an image capture apparatus including: an image capturing unit; a light emitting unit; a first image capture controller configured to control the image capturing unit to capture a plurality of images at a first timing; a second image capture controller configured to control the image capturing unit to capture an image under a capturing condition illuminated by the light emitting unit at a second timing that is either directly before or directly after the first timing; an addition combination section configured to positionally align the images captured under control by the first image capture controller and to perform an addition combination on the aligned images to generate a combined image; and a combination section configured to combine the combined image generated by the addition combination section with the image captured under control by the second image capture controller.

According to a second aspect of the present invention, there is provided an image capturing method including: controlling an image capturing unit to capture a plurality of images at a first timing; controlling the image capturing unit to capture an image under a capturing condition illuminated by a light emitting unit at a second timing that is either directly before or directly after the first timing; positionally aligning the images captured at the first timing and performing an addition combination on the aligned images to generate a combined image; and combining the combined image with the image captured under the capturing condition illuminated by the light emitting unit at the second timing.

According to a third aspect of the present invention, there is provided a non-transitory computer readable medium containing a software program for causing a computer included in an image capture apparatus including an image capturing unit and a light emitting unit to execute a process including: controlling the image capturing unit to capture a plurality of images at a first timing; controlling the image capturing unit to capture an image under a capturing condition illuminated by the light emitting unit at a second timing that is either directly before or directly after the first timing; positionally aligning the images captured at the first timing and performing an addition combination on the aligned images to generate a combined image; and combining the combined image with the image captured under the capturing condition illuminated by the light emitting unit at the second timing.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1:
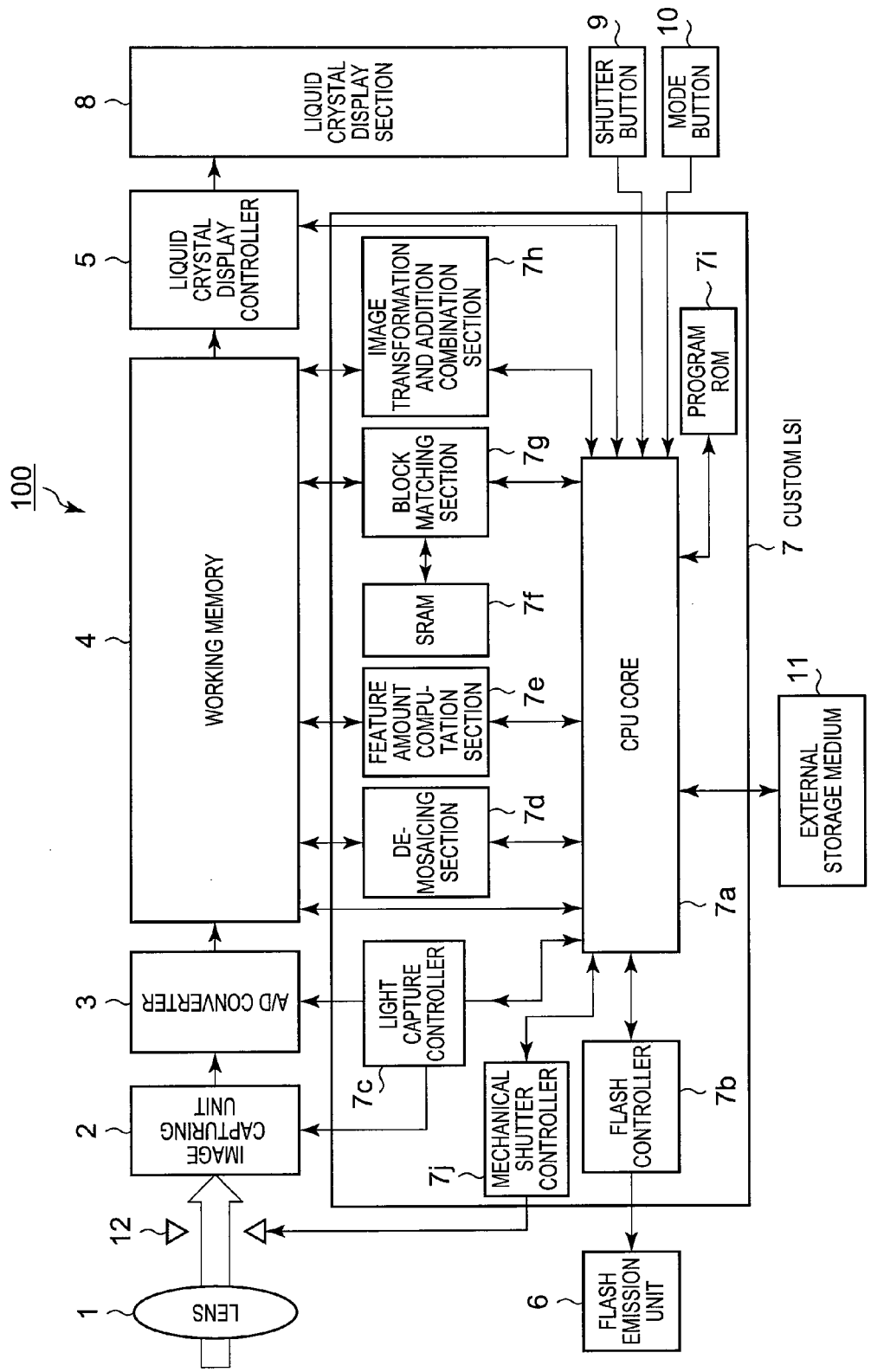
FIG. 1 is a circuit block diagram of a digital camera common to each of the exemplary embodiments described herein.

Embodiments according to the present invention will be described in detail with reference to the accompanying drawings. The scope of the claimed invention should not be limited to the examples illustrated in the drawings and those described in below.

Explanation follows of exemplary embodiments, with reference to the drawings. FIG. 1 is a circuit block diagram showing an electrical configuration of a digital camera 100 common to each of the embodiments described herein. The digital camera 100 is a digital camera having generic functions, such as Auto Exposure (AE), Auto White Balance (AWB) and Auto Focus (AF). Namely, a lens block 1 includes an optical system with a zoom lens, a focusing lens (not shown in the figures) and the like, and a drive mechanism for driving the optical system.

An image capturing unit 2, configured with a mechanical shutter 12 and a Complementary Metal Oxide Semiconductor (CMOS) image capture element, is disposed on the optical axis of the lens block 1. An analogue signal representing an image from the image capturing unit 2 is converted into a digital signal by an A/D converter 3 and stored in a working memory 4 configured by Dynamic Random Access Memory (DRAM).

A custom Large Scale Integration (LSI) 7 performs processing, such as pedestal clamping, on the image signal stored in the working memory 4, then converts this into a luminance (Y) signal and chrominance (UV) signal, and performs digital signal processing in order to improve image quality by auto-white balance, edge enhancement, pixel interpolation and the like. In image capture mode, each time one frame's worth of data (image data) is stored in the working memory 4 it is converted into a video signal, and transmitted to a liquid crystal display controller 5. The liquid crystal display controller 5 drives a liquid crystal display section 8 according to the video signal transmitted from the working memory 4. Successively captured images are thereby displayed in liveview on the liquid crystal display section 8. In the image capture mode, as triggered by operation of a shutter button 9 the image data is temporarily stored in the working memory 4, and this temporarily stored image data is then compressed by the custom LSI 7 and finally stored on an external storage medium 11 as a still image file of a specific format.

The custom LSI 7 includes a Central Processor Unit (CPU) core 7a, a flash controller 7b, a light capture controller 7c, a de-mosaicing section 7d, a feature amount computation section 7e, a Static Random Access Memory (SRAM) 7f, a block matching section 7g, an image transformation and addition combination section 7h, a program ROM 7i, and a mechanical shutter controller 7j.

The CPU core 7a executes various processing according to a program stored on the program ROM 7i, while utilizing the working memory 4 as a working area, and controls each of the sections configuring the custom LSI 7. The flash controller 7b controls the light emission timing of a flash emission unit 6 under instruction from the CPU core 7a. The light capture controller 7c controls the operational timing of the image capturing unit 2 configured by a CMOS image capture element, and the A/D converter 3 so as to function as an electronic shutter.

The de-mosaicing section 7d performs de-mosaicing processing on a RAW image (uncompressed image). The feature amount computation section 7e is employed for detecting face images in captured images, and for detecting blinking in any detected face image, or more precisely for determining whether or not the eyes are open. The block matching section 7g employs the SRAM 6e as a working area and performs block matching between respective images, as required when performing image positional alignment. The image transformation and addition combination section 7h performs processing such as addition combination on non-flash images, these being images captured without accompanying emission of the flash emission unit 6, and on flash images, these being images captured with accompanying emission of the flash emission unit 6. The mechanical shutter controller 7j controls the mechanical shutter 12.

The shutter button 9, a mode button 10 and the external storage medium 11 are connected to the CPU core 7a of the custom LSI 7. The shutter button 9 is configured by a button switch having a two-stage operation stroke, these being a first stage operation stroke (half press) and a second stage operation stroke (full press). The mode button 10 transmits an instruction signal for switching between image capture and reproduction modes according to user operation. In image capture modes an instruction signal for a more precise image capture mode is output, such as "night scene and portrait by successive exposure combination mode".

The external storage medium 11 is a removable recording medium, such as an SD card. Image data of an image captured in an image capture mode, such as normal image capture mode, or "night scene and portrait by successive exposure combination mode", is stored on the external storage medium 11. During reproduction, image data read out from the external storage medium 11 is supplied to the liquid crystal display controller 5 via the CPU core 7a and a reproduced image is displayed on the liquid crystal display section 8.

Program AE data configuring a program line chart expressing combinations of aperture numbers and shutter speeds (shutter durations, exposure times) corresponding to appropriate exposure, these giving appropriate exposure values for image capture, are stored on the program ROM 7i.

First Exemplary Embodiment

Figure 2:
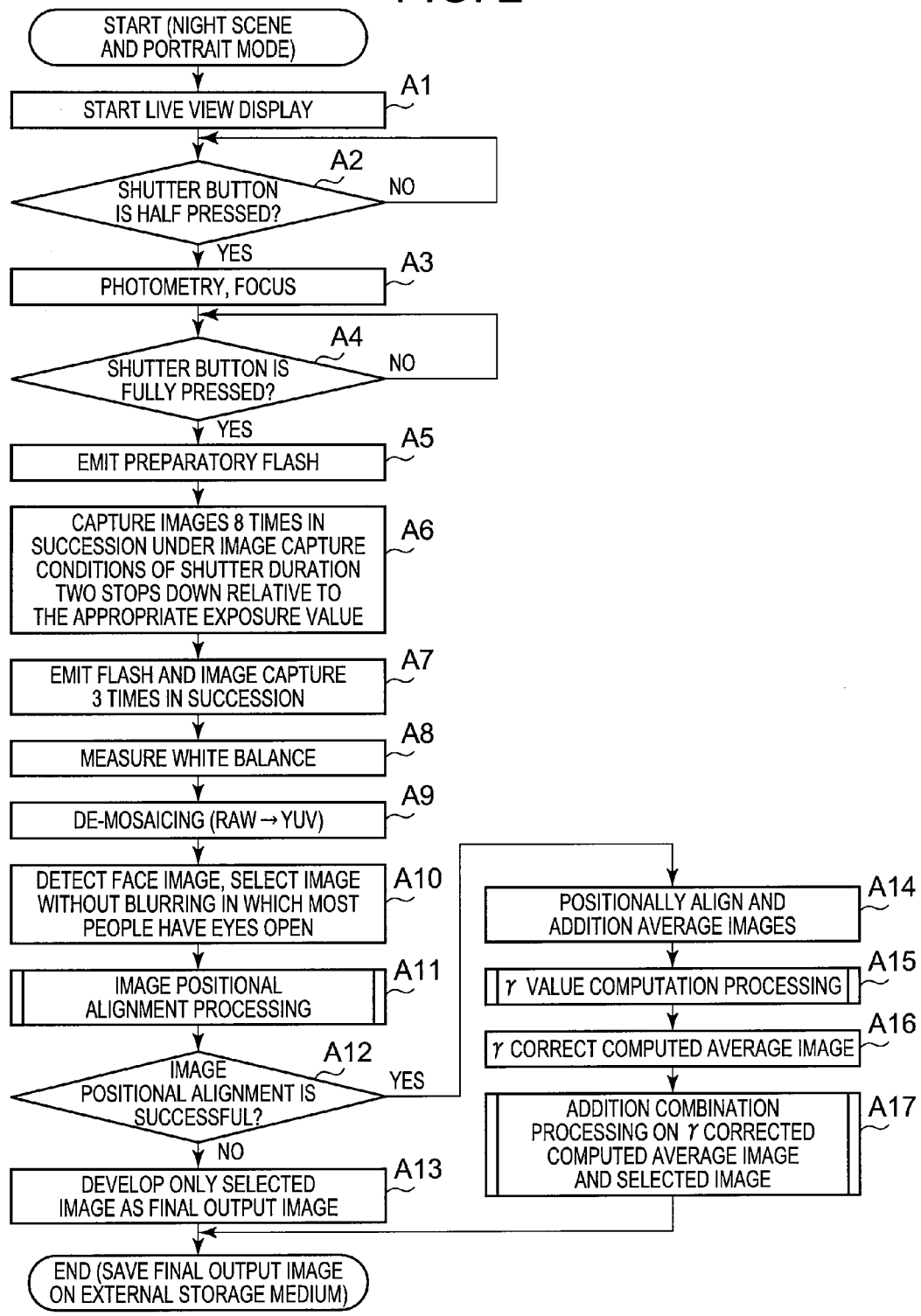
FIG. 2 is a flow chart showing a processing sequence in a first exemplary embodiment.

Explanation follows regarding operation of a first exemplary embodiment, with reference to the flow chart of FIG. 2. When a user operates the mode button 10 and sets the image capture mode to "night scene and portrait mode", the CPU core 7a of the custom LSI 7 commences processing according to a program stored on the program ROM 7i.

First, the CPU core 7a controls the liquid crystal display controller 5 so as to display successively captured images on the liquid crystal display section 8 in live view (step A1). Next, the CPU core 7a determines whether or not the shutter button 9 has been half-pressed (step A2). If the shutter button 9 has been half-pressed then photometrical processing and focusing processing is executed, thereby obtaining an appropriate exposure value and focus position (step A3). Accordingly, appropriate exposure value of aperture number and shutter speed (also referred to later as shutter duration and exposure time) is computed from the photometrical processing of step A3.

Determination at step A4 is YES when a user fully depresses the shutter button 9 in order to perform image capturing. The CPU core 7a accordingly proceeds from step A4 to step A5, instructs the flash controller 7b, and the flash emission unit 6 emits a preparatory flash (step A5). This preparatory flash is for the purposes of adjusting the amount of light emitted by the flash emission unit 6 and preventing red-eye in the eyes of people who are the main subject. The preparatory flash is executed, for example, at least 0.8 seconds prior to the flash emission accompanying image capture at step A7, described below.

Then, without flash emission from the flash emission unit 6, image capture is first performed 8 times in succession using a rolling shutter method under image capture conditions of the shutter duration (exposure time) two stops down relative to the appropriate exposure value (¼ the exposure time corresponding to the appropriate exposure value computed in terms of exposure time) (step A6).

The flash emission unit 6 is then, by driving with the flash controller 7b, caused to emit a flash and images are captured 3 times in succession with a mechanical shutter method (step A7). The intervals here between the mechanical shutter 12 are set in order to avoid capturing a blinking image in which an image is captured of a subject person in a state of blinking, for example 0.1 seconds apart or greater.

The image capture conditions when image capture is made at step A7 are image capture with at a lower ISO sensitivity to that of image capture in step A6. In order to not, as far as possible, capture the background in the distance, the mechanical shutter controller 7j controls the mechanical shutter 12 such that the open state is only for the timing at which the flash emission unit 6 emits a flash.

Figure 3:
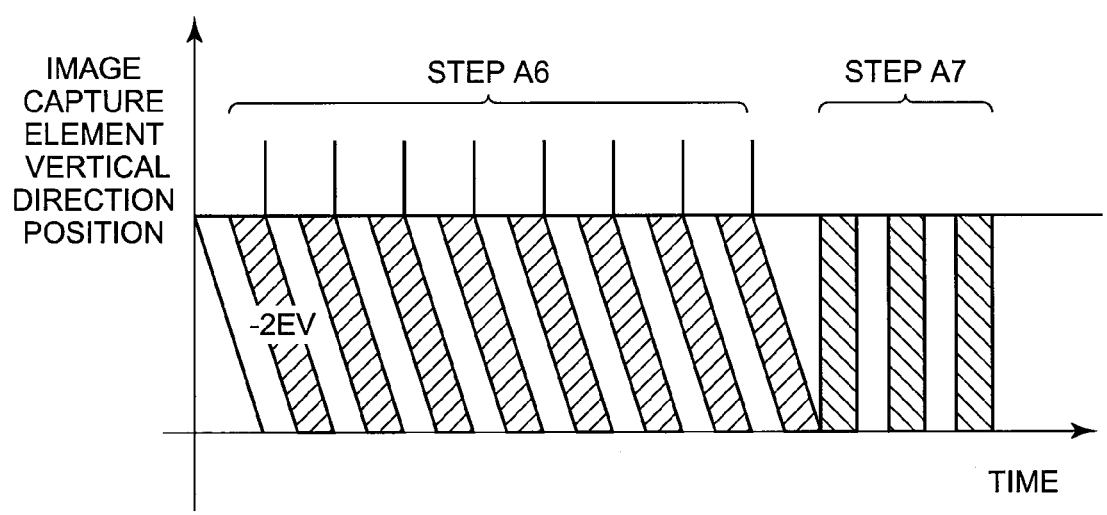
FIG. 3 is a diagram showing timing of image capture in the first exemplary embodiment.

Consequently, as shown in FIG. 3, 8 frames of RAW image and 3 frames of RAW image are stored in the working memory 4 by the respective processing of step A6 and step A7, a total of 11 frames of RAW image.

Figure 4:
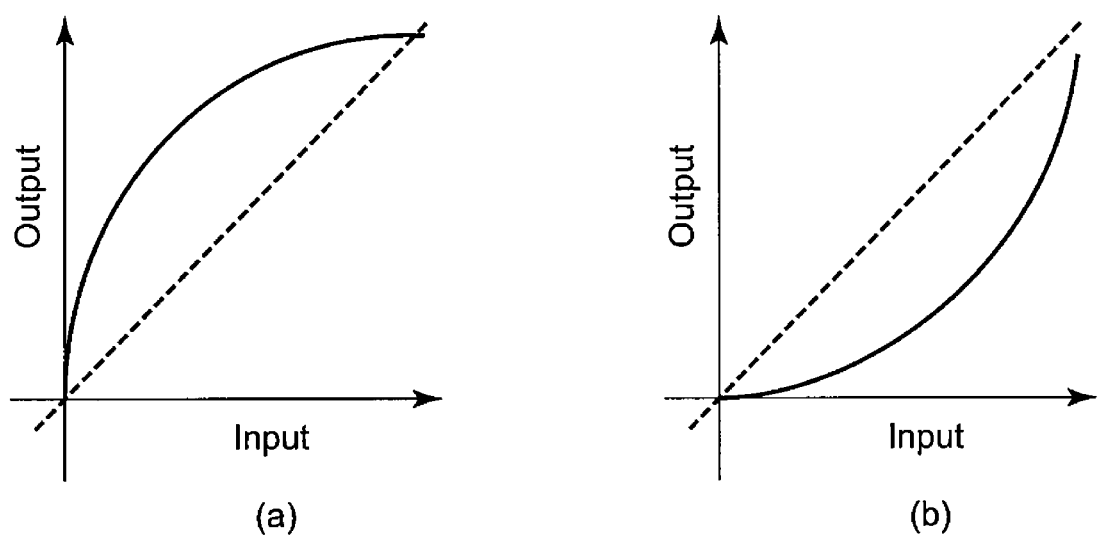
FIG. 4A and FIG. 4B are graphs showing tone curve settings during de-mosaicing.

At step A8, the white balance is measured for these 11 frames of RAW image. Then, based on the white balances measured at step A8, de-mosaicing is performed for all of the 11 frames of RAW image using the de-mosaicing section 7d (step A9). When this is performed, as shown in FIG. 4A, a γ curve is determined for the 3 frames of RAW image captured at step A7 according to the degree of histogram expansion. However, as shown in FIG. 4B, for the RAW images captured at step A6, in order to suppress a whiteout state from occurring, a tone curve of inverse γ is interpolated. The luminance of whiteout portions due to the flash emission can thereby be suppressed.

Next, by computation processing using the feature amount computation section 7e, face images of the subject are detected in the 3 frames out of the de-mosaiced 11 frames corresponding to the images captured in step A7, and the image with the highest evaluation is selected, with reference to determination of whether or not there is little blurring of any face images detected or to determination as to which image has the most face images with their eyes open (for cases containing plural subject persons) (step A10). The image selected at step A10 is an image employed in cases, described below, where there is no match in the positional alignment processing to the images corresponding to the images captured in step A6, and in addition combination with an image corresponding to one captured in step A6.

When an image has been finally selected at step A10, positional alignment processing is executed on the selected image and the 8 frames of image corresponding to the images captured in step A6 (step A11).

Figure 5:
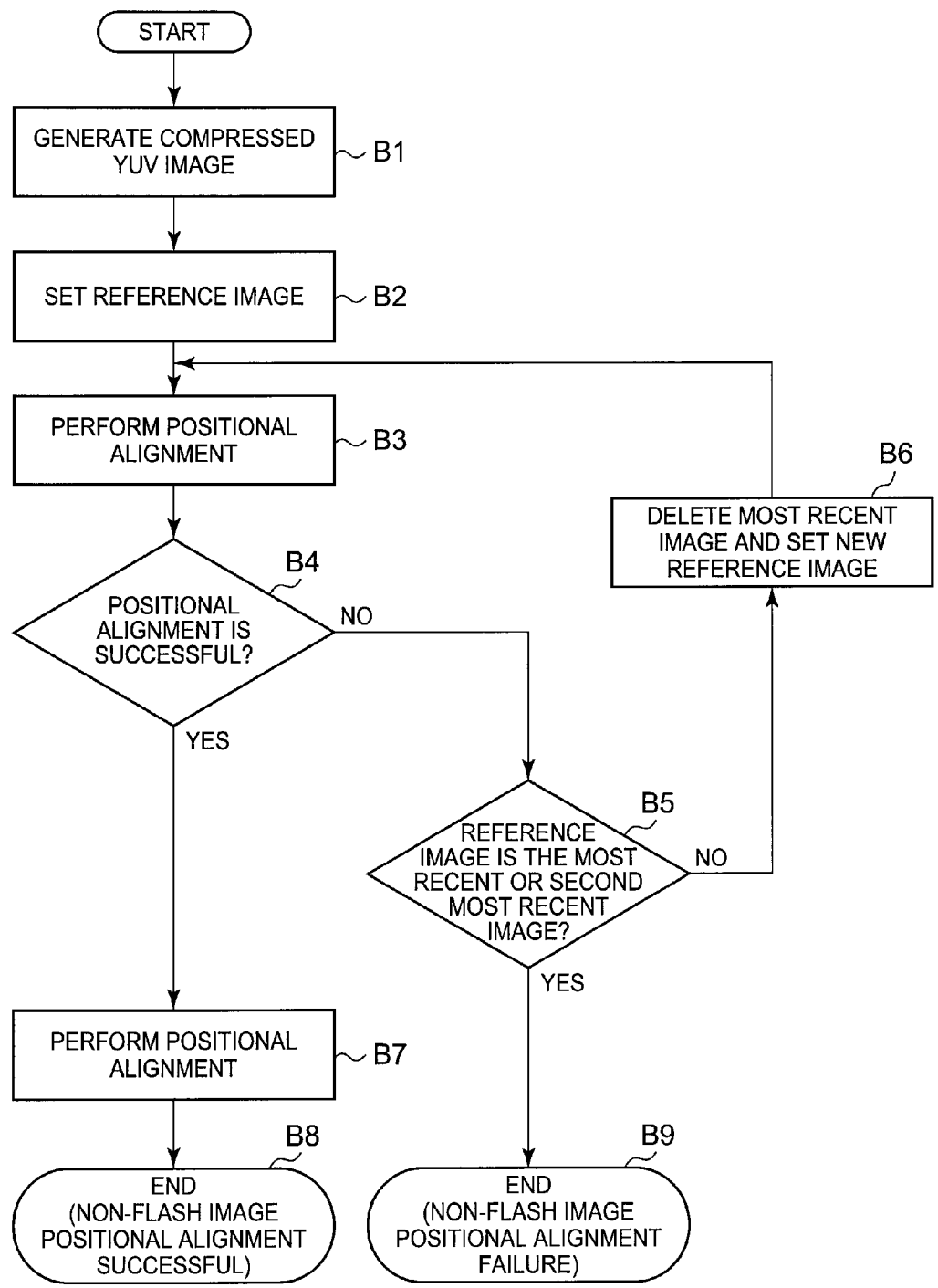
FIG. 5 is a flow chart showing a processing sequence for image positional alignment processing.

FIG. 5 is a flow chart showing a processing sequence of this image positional alignment processing (step A11). In order to perform positional alignment on the images, first YUV images are respectively generated without size conversion for the 8 frames of RAW image captured at step A6 and the 3 frames of RAW image captured at step A7, then compressed YUV images are generated that have been compressed to the VGA size employed in positional alignment (step B1). A reference image needs to be set as the image that acts as a reference when performing positional alignment between respective images. In the present exemplary embodiment, for the compressed YUV images corresponding to the successively captured images at step A6, initially the compressed YUV image corresponding to an image captured at a central point in time is set as the reference image (step B2). For example, in the present exemplary embodiment, the compressed YUV image corresponding to the fourth image from starting image capture 8 times in succession, a central point in time, is set as the reference image.

The setting method for the reference image is not limited to setting to an image captured at a central point in time, and configuration may be made such that setting is for the first image captured, or the image captured immediately prior to the image capture of step A7. (When the objective is to eventually combine with an image captured during flash emission, preferably the image captured immediately prior to image capture at step A7 is selected).

Next, positional alignment is performed of the reference image set at step B2 with the other 7 frames of compressed YUV images (step B3). This positional alignment is performed by block matching, and a RANSAC (RANdom SAmple Consensus) method. When this is being performed, when camera shake occurs during the successive imaging of step A6, the successive images do not match, and occasions arise when image positional alignment fails.

Consequently, at the next step B4, determination is made as to whether or not positional alignment is successful with the compressed YUV image of the image captured that is most recent out of the 8 times of successive image capture of step A6. The determination of whether or not image positional alignment has succeeded is determination in which, for example, positional alignment is assessed as having succeeded when 90% or more of the blocks match those of the reference image during block matching, and positional alignment is assessed as having failed when less than 90% match. Namely, determination is made as to whether or not the images substantially match. When positional alignment at B4 has succeeded, processing proceeds from step B4 to step B7, and moves on to positional alignment with an image captured at step A7.

Configuration may be made such that positional alignment is assessed as having succeeded for cases where there is a complete match (100% match) of blocks to the reference image during block matching, and positional alignment failure assessed as occurring for other cases.

However, when positional alignment has not succeeded in step B4, determination is made as to whether or not the reference image set at step B2 is a compressed YUV image corresponding to the most recent or the second most recent image out of the 8 frames of image successively captured (step B5). When determination is made that it is not the compressed YUV image corresponding to the most recent or the second most recent captured image, the compressed YUV image corresponding to the most recent or the second most recent captured image out of the 8 frames captured in succession is deleted, and a new reference image is set from the remaining plural compressed YUV images (step B6). A compressed YUV image corresponding to an image captured at a central point in time from the remaining plural compressed YUV images is set as the new reference image in step B6 too.

Consequently, along with each determination at step B4 of NO there is positional alignment failure and a compressed YUV image is deleted by the processing of step B6, reducing the number of frames of compressed YUV image for positional alignment. Repetition of such processing results in a shift for setting the reference image towards the sequentially oldest captured image. By repeating this processing, positional alignment of the compressed YUV image is determined to be a failure when determination is made at step B5 that the reference image is the compressed YUV image corresponding to the second most recent captured image, and processing is ended (step B9).

When the positional alignment has succeeded at step B5, positional alignment is performed of the reference image with the compressed YUV image corresponding to the oldest captured image from the images captured at step A7 (step B7), and image positional alignment is ended (step B8).

Positional alignment of the images at step A11 of FIG. 2 is performed in this manner, and as a result determination is made as to whether or not positional alignment has succeeded (step A12). When positional alignment has succeeded at step B8, processing proceeds from step A12 to step A14. Then, for the number of frames with which positional alignment succeeded (3 to 8 frames), the respective YUV images generated in step B1 without size modification are positional aligned, and addition averaged (step A14).

In other words, by addition averaging for each block that matched in block matching, an addition average image is generated of the YUV images for which positional alignment succeeded.

In the present exemplary embodiment, positional alignment is made for the number of frames worth for which positional alignment succeeded, and an addition average taken thereof, however configuration may be made such that the 8 frames of YUV images are positionally aligned and an addition average taken thereof.

Figure 6:
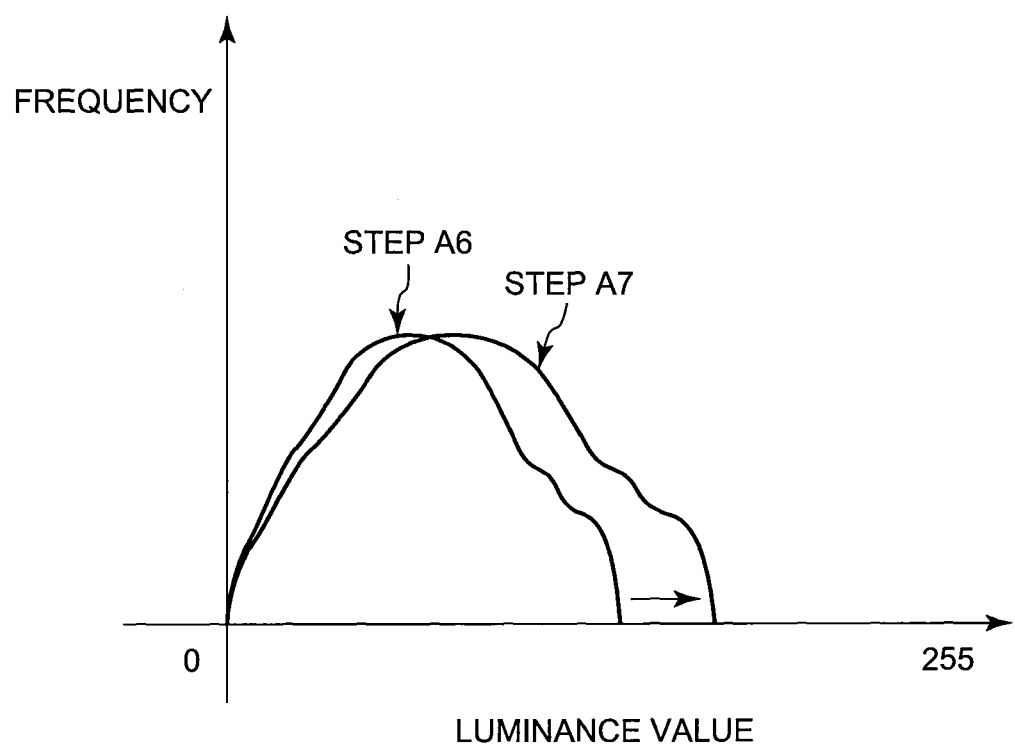
FIG. 6 is a graph showing histograms of an addition average image.

Next, $\gamma$ (correction) value computation processing of the addition average image is executed (step A15). This processing is performed in order to suppress the background from becoming too dark. Namely, when calculating the average of the RAW image captured at step A6 and the RAW image captured at step A7, if clear separation is made into regions in which the pixel values are large in the RAW image captured at step A6, and regions where the pixel values are large in the RAW image captured at step A7, then it is possible to restore gain by histogram expansion at a later stage. However, as shown in FIG. 6, when there are overlapping regions in both where the pixel values are large, as the overlapping locations of the images increase in number, this leads to stretching of the high luminance side in the histogram. In such instances, there is little room for histogram expansion, gain cannot be restored, and in particular, the background not reached by light from the flash is corrected darker. Therefore, the background is suppressed from becoming darker by applying $\gamma$ correction to the YUV images corresponding to images captured at step A6.

Figure 7:
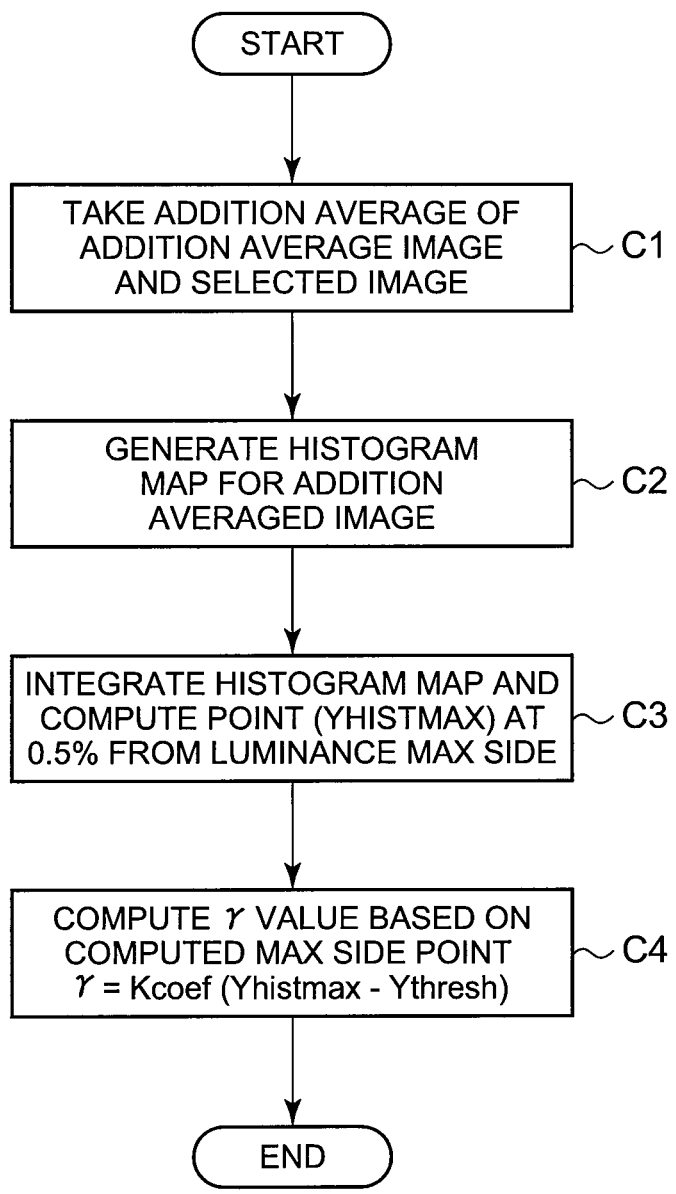
FIG. 7 is a flow chart showing a processing sequence of γ value computation processing.

FIG. 7 is a flow chart showing a processing sequence of $\gamma$ value computation processing of the addition average image (step A15). First an addition average is taken of the addition average image and the YUV image corresponding to the images captured at step A7 (step C1). Then a histogram map is generated of the luminance values addition averaged in step C1 (step C2). The generated histogram map is integrated and the MAX side point (Yhistmax), this being the position at 0.5% from the luminescence MAX (maximum) side, is computed (step C3). The $\gamma$ value is computed based on the computed MAX side point according to the following equation (step C4).

$$\gamma = K\text{coef}(Y\text{histmax} - Y\text{thresh})$$

wherein:

$\gamma$=the $\gamma$ value of $\gamma$ correction to apply to the non-flash image;

Kcoef is an adjustment coefficient;

Yhistmax is the luminance value at the histogram MAX side 0.5% point in the unmodified addition average image; and Ythresh is an adjustment threshold value.

In step A16 succeeding step A15 of the flow chart of FIG. 2, the addition average image obtained at step A14 is corrected with the $\gamma$ value obtained at step A15. Then combination addition processing is performed on the $\gamma$ corrected addition average image and the image selected at step A10 (step A17).

Accordingly, due to performing $\gamma$ correction on the addition average image at step A16 prior to performing addition combination processing at step A17, lowering of the luminescence of the background (night view) can be suppressed.

Figure 8:
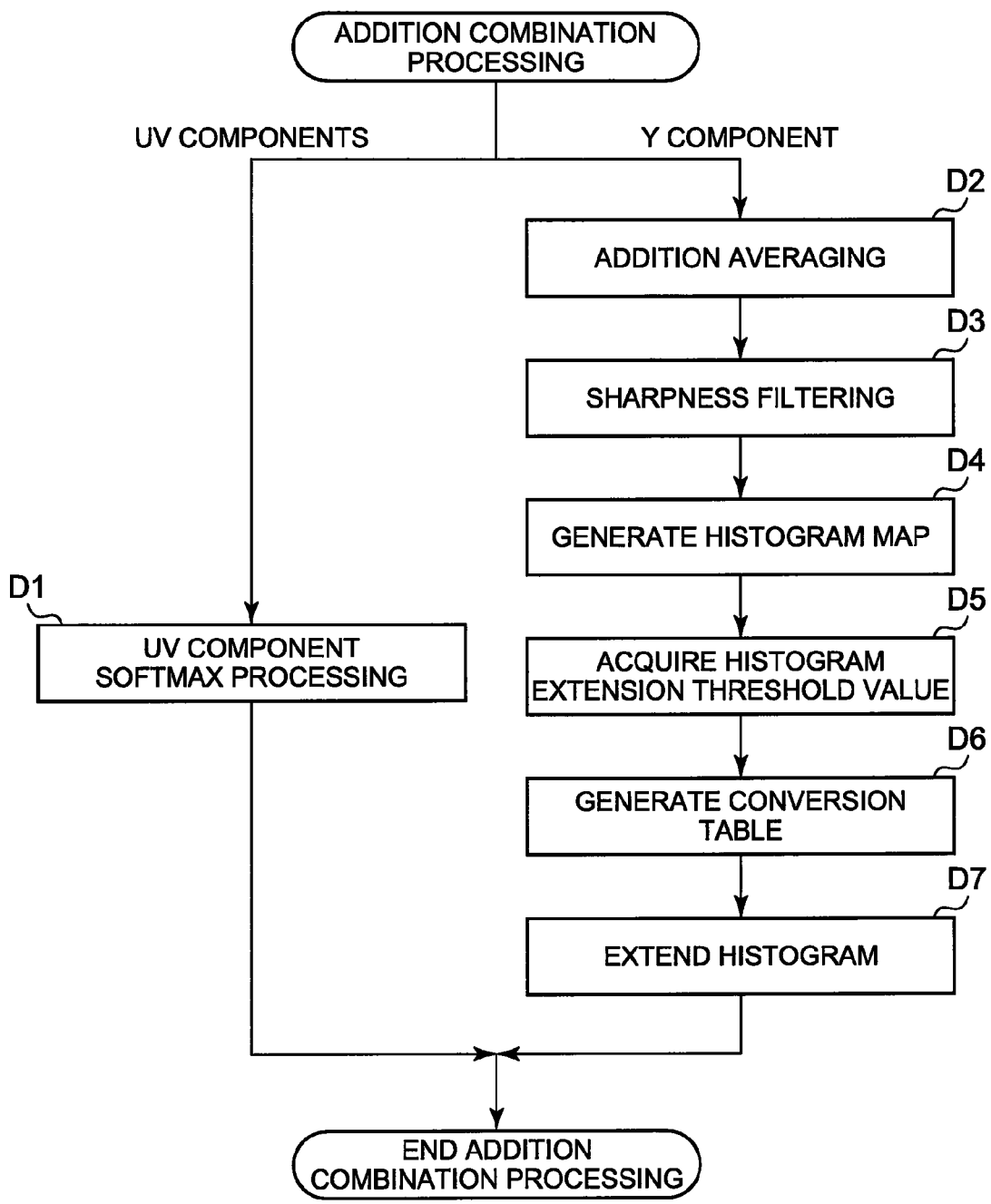
FIG. 8 is a flow chart showing a processing sequence of addition combination processing.

FIG. 8 is a flow chart showing details of the addition combination processing executed at step A17. In the flow chart, the processing of steps D2 to D7 is executed on the Y (luminance) component of the YUV components, and only the processing of step D1 is performed on the U component (difference of luminance and blue component) and the V component (difference of luminance and red component).

Namely, an addition average is taken of the $\gamma$ corrected addition average image obtained at step A16 and the image selected at step A10, and an addition combined image is generated (step D2). A sharpness filter is applied to the image obtained by addition averaging, enhancing the edges of the image (step D3). A histogram map is also generated of the luminance value distribution of Y (step D4). However, since generation processing time is required for a histogram map performed by measuring all the pixels, measurements are made, for example, every 100th pixel.

Next, the histogram expansion threshold value is acquired (step D5). Namely, the luminance value at the point at 0.5% of the histogram map surface area on the high luminance side is derived. A tone curve pixel conversion table, namely a conversion table for linear conversion such that the extension point on the high luminance side derived at step D5 becomes 255 (when the luminance is expressed in 8 bits), is generated (step D6). Based on the generated conversion table, the Y component of the addition average image generated at step D2 is extended.

For the UV components, combination is made with Softmax processing (step D1). With respect to the U component, the output value calculated by the equation shown in the example below is taken as the Softmax output value (USoftmax) of U.

$$U\text{comp} = (U\text{ave} + U\text{max} \times \text{Coef})/(1+\text{Coef})$$

wherein:

Ucomp is the USofmax output value;

Uave is the average value of U;

Umax is the value of U in the image in which the sum of the absolute value of U and the absolute value of V is the greatest; and Coef is an adjustment coefficient.

With respect to the V component, the output value calculated by the equation shown in the example below is taken as the Softmax output value (VSoftmax) of V.

$$V\text{comp} = (V\text{ave} + V\text{max} \times \text{Coef})/(1+\text{Coef})$$

wherein:

Vcomp is the VSofmax output value;

Vave is the average value of V;

Vmax is the value of V in the image in which the sum of the absolute values of U and the absolute values of V is the greatest; and Coef is an adjustment coefficient.

When addition combination processing of the addition average image γ corrected at step A17 of the flow chart of FIG. 2 and the image selected at step A10 has been completed in this manner, the combination addition processed image is saved on the external storage medium 11 as the final output image.

Accordingly, an image of high quality, which is an image in which both an image of a night view and an image of a human subject are distinct and without thermal noise, can be obtained.

However, in the present exemplary embodiment, the flash emission unit 6 is caused to emit light and images are captured successively 3 times, and an image with a high evaluation for low blurring of the face image is selected (step A10) for use in addition combination. Consequently, an image can be stored of high quality having a person as the main subject.

However, as stated above, if the image positional alignment processing is completed at step B9 and positional alignment has failed, processing proceeds from step A12 to step A13. Then at step A13, only an image of one frame selected at step A10 is developed, for example in JPEG format, as the final output image. This final output image is also stored on the external storage medium 11.

The image selected at step A10 is, as stated above, an image in which a face is detected having low blurring, and is an image in which most of the people of a plural human subject have their eyes open. Consequently, even during image capture when the positional alignment of non-flash image fails, an image can be stored in which there is less blurring, and in which more of the people have their eyes open in a plural human subject.

In the present exemplary embodiment, the processing of step A7 is performed after the processing of step A6, however configuration may be made in which the opposite sequence is employed.

In the present exemplary embodiment, the image selected at step A10 is employed in addition combination. However, in cases where image positional alignment has succeeded and images are substantially positionally aligned, the image captured directly after the processing of step A6 may be employed in addition combination.

By so doing, even in cases where all of the images captured 3 times in succession are blurred, the image with the highest degree of matching in relation to the images captured 8 times in succession can be employed in the addition combination.

In the present exemplary embodiment, configuration is made such that the final output image addition combined at step A17 is stored on the external storage medium 11 without further modification, however configuration may be made such that a white balance adjustment step (white balance adjustment section) is provided for matching such that the white balance of the final output image matches the white balance of the images captured 3 times in succession. An image with appropriate white balance for a human subject can thereby be stored as the final output image.

Second Exemplary Embodiment

Figure 9:
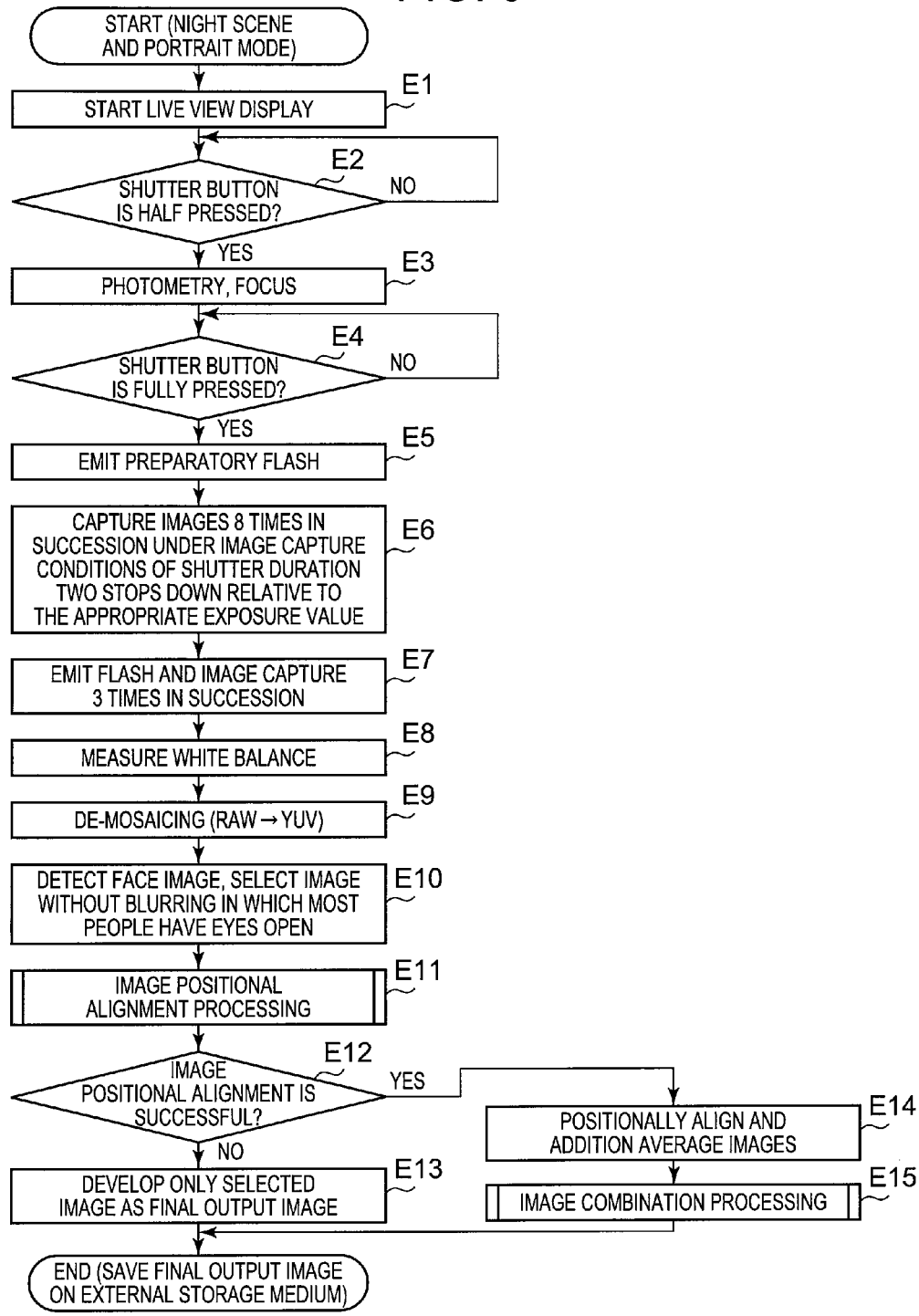
FIG. 9 is a flow chart showing a processing sequence in a second exemplary embodiment.

FIG. 9 is a flow chart showing a processing sequence in a second exemplary embodiment. The present exemplary embodiment differs in combination sequence to that of the first exemplary embodiment in that gain adjustment of the luminance of the pixels is performed by a YMax value after addition averaging, in place of combination by γ correction and histogram expansion.

In the flow chart of FIG. 9, steps E1 to E14 are the same as the steps A1 to A14 of the flow chart of the first exemplary embodiment shown in FIG. 2. Consequently, further explanation regarding steps E1 to E14 is omitted here. Image combination processing is executed in step E15 in place of steps A15 to A17 of the first exemplary embodiment.

Figure 10:
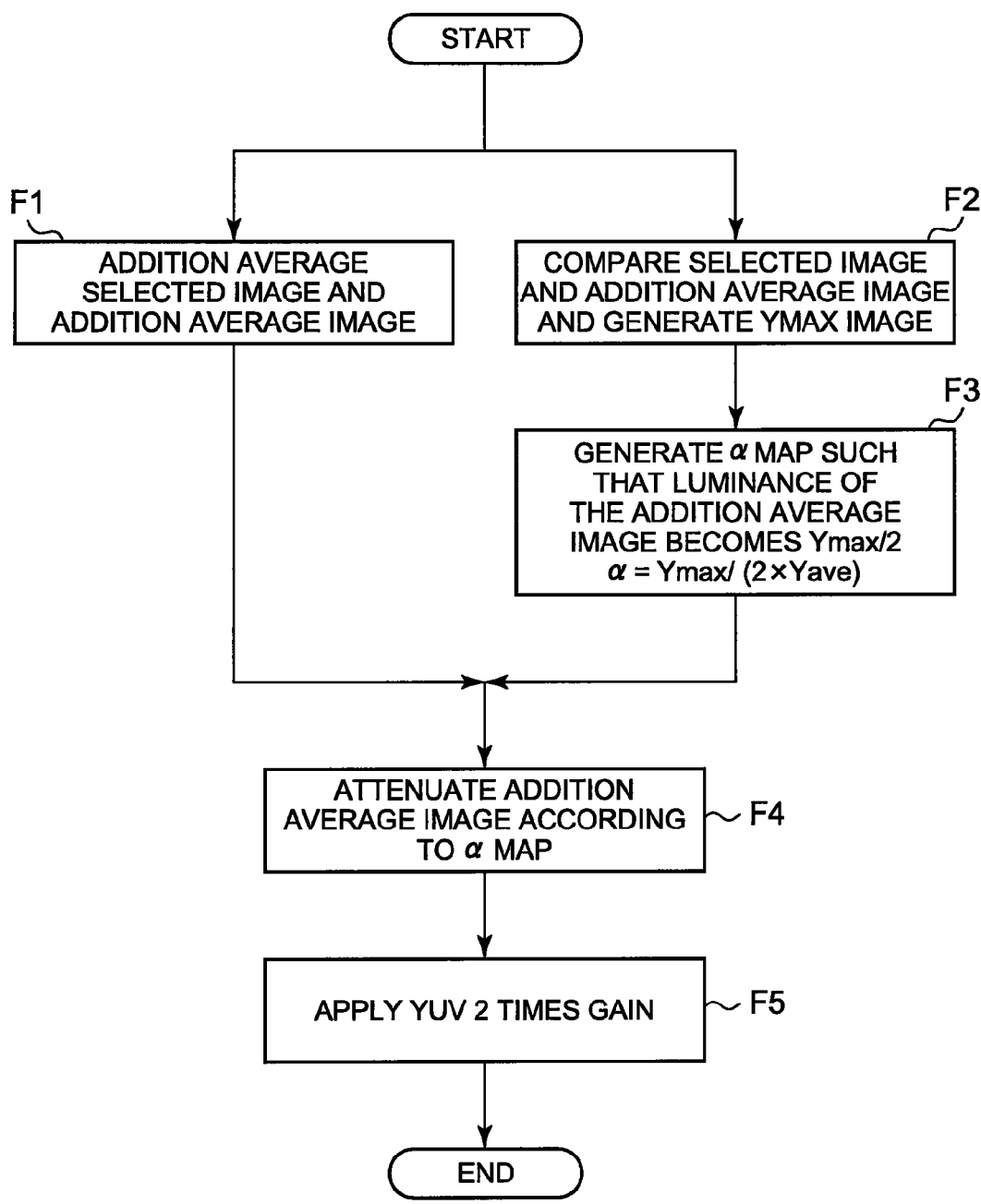
FIG. 10 is a flow chart showing a processing sequence of image combination processing.

FIG. 10 is a flow chart showing a processing sequence of image combination processing. An addition average is taken of the image selected at step E10 and the addition average image (step F1).

A Ymax image configured from the MAX values (maximum values) of luminance from the selected image and the addition average image is generated (step F2). An α map is generated such that the luminance of the addition average image of step F1 is Ymax/2 (step F3).

Namely, α is derived for each of the pixels such that the Yave, which is the average value of the luminance of the addition average image obtained at step F1, becomes Ymax/2. Specifically, computation of α=Ymax/(2×Yave) is performed. By performing this computation, the histogram distribution always becomes 128 or lower (when the luminance is expressed in 8 bits).

Following this, the addition average image is attenuated by multiplying the addition average image obtained at step F1 by each respective value of the α map obtained at step F3 (step F4). Due to the processing of step F4, the histogram that has been compressed is restored by applying 2 times gain thereto (step F5).

The combining processing of step E15 in the flow chart of FIG. 9 is completed by the above, and the image obtained at step F5 is saved on the external storage medium 11 as the final output image.

Consequently, according to the present exemplary embodiment, combining processing can be performed more simply than in the first exemplary embodiment.

Third Exemplary Embodiment

Figure 11:
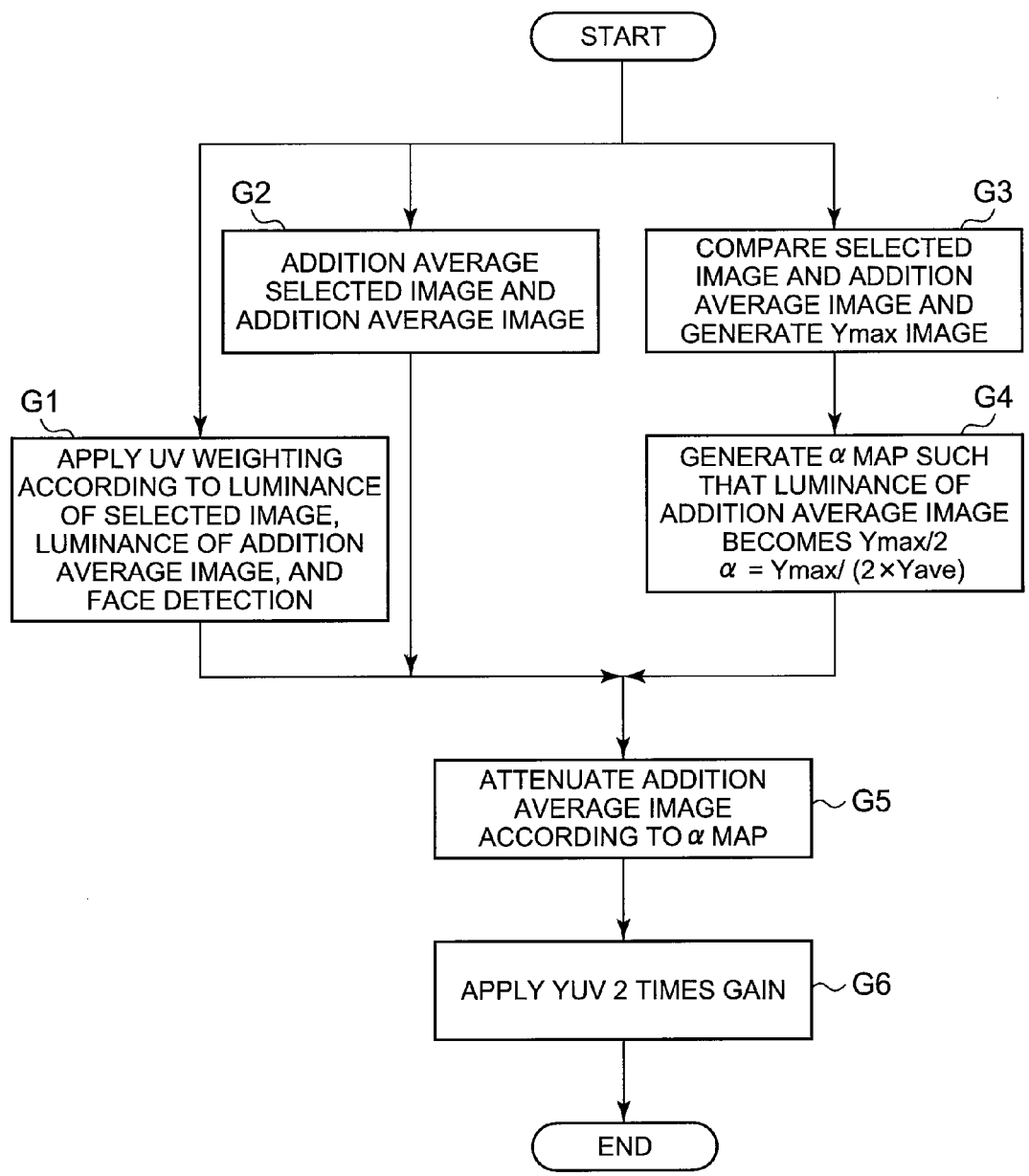
FIG. 11 is a flow chart showing a processing sequence of image combination processing in the second exemplary embodiment.

FIG. 11 is a flow chart showing a processing sequence of image combination processing executed at step E15 of the flow chart of FIG. 9 in a third exemplary embodiment.

Namely, the overall processing of the third exemplary embodiment is executed similarly to in the second exemplary embodiment according to the flow chart shown in FIG. 9. However, the image combination processing (step 15) is executed according to the flow chart shown in FIG. 11 in the third exemplary embodiment, in contrast to the second exemplary embodiment in which the image combination processing (step E15) is executed according to the flow chart shown in FIG. 10.

In the flow chart of FIG. 11, steps G2 to G6 are the same as the steps F1 to F5, respectively, of the flow chart of the second exemplary embodiment shown in FIG. 10. A new step G1 is added to steps G2 to G6, which are the same processing as that of the steps F1 to F5 of the flow chart of FIG. 10. In the additional step G1, UV weighted addition processing is executed on the luminance of the selected image and the luminance of the addition average image.

Figure 12:
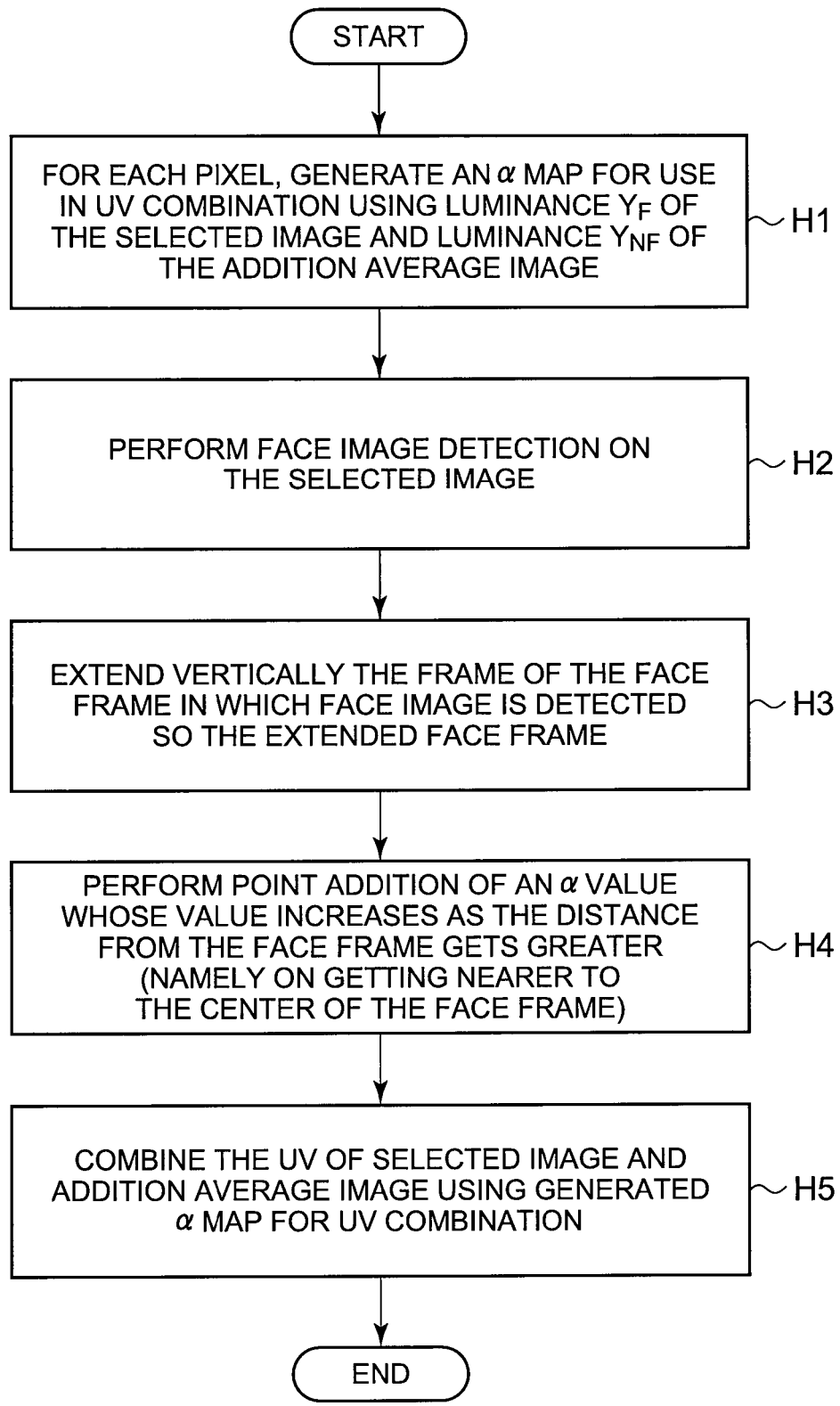
FIG. 12 is a flow chart showing details of step G1 in the flow chart of FIG. 11.

FIG. 12 is a flow chart showing a processing sequence of UV weighted addition processing (step G1). First, for each pixel, an α map for use in UV combination is generated using the luminance $Y_F$ of the image selected at step E10, and the luminance $Y_{NF}$ of the addition average image (step H1). The UV weighting a formula is shown below.

$$\alpha_{UVF}(x,y) = \alpha_F(Y_F(x,y)) - \alpha_{NF}(Y_{NF}(x,y)) + 0.5$$

(clipping processing is applied if the right hand side exceeds the range 0 to 1.0), wherein x,y are the coordinates of the pixel.

Figure 13:
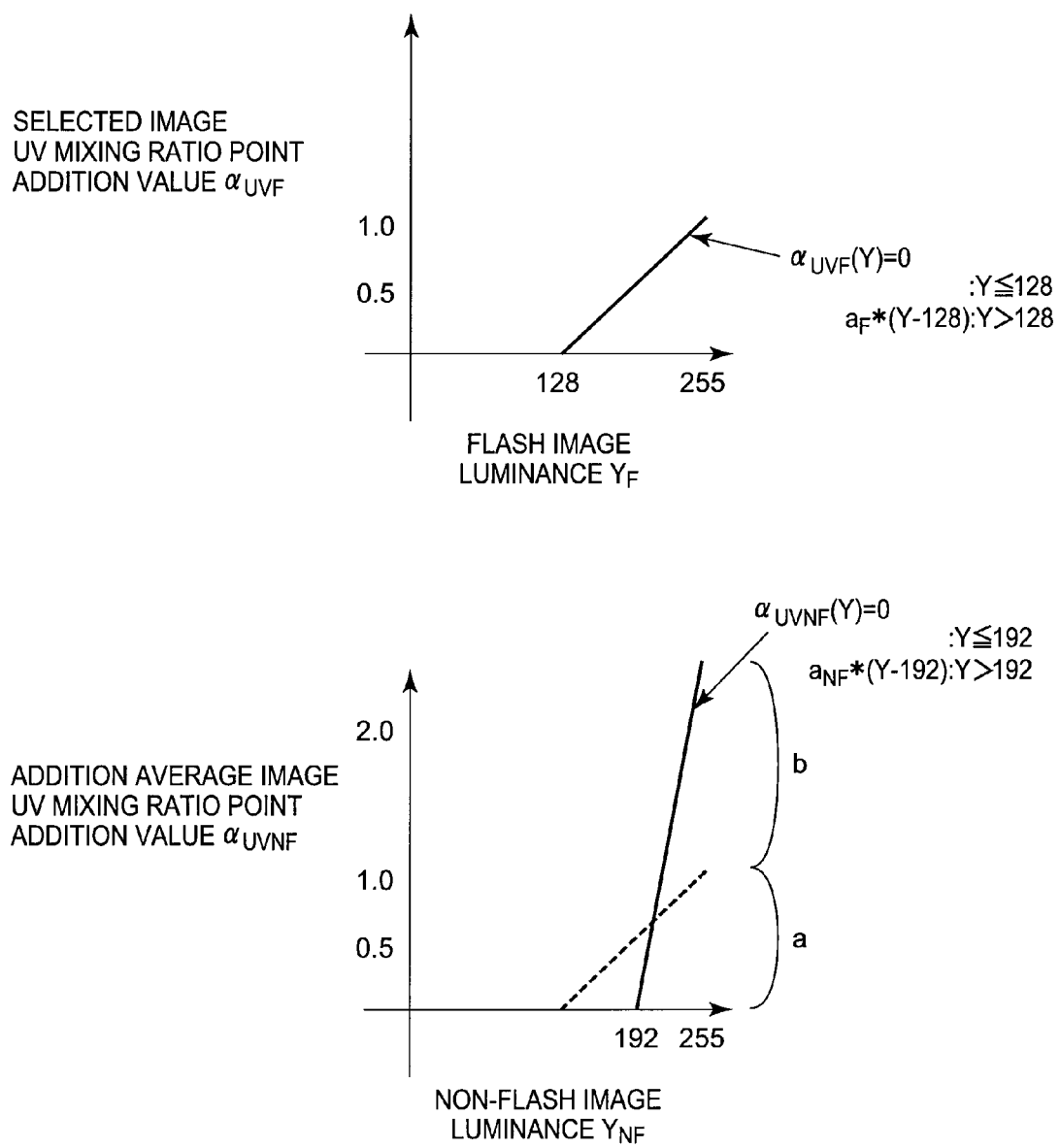
FIG. 13 is a diagram with graphs showing characteristics of UV weighting α values.

In the above function, $\alpha_F(Y)$, $\alpha_{NF}(Y)$ are given the following characteristics as shown in FIG. 13.

$$\alpha_F(Y) = 0 \qquad \text{(for } Y \leq 128)$$
$$\quad = a_F \times (Y - 128) \quad \text{(for } Y > 128)$$
$$\alpha_{NF}(Y) = 0 \qquad \text{(for } Y \leq 192)$$
$$\quad = a_{NF} \times (Y - 192) \quad \text{(for } Y > 192, a_{NF} > a_F)$$

In FIG. 13, $\alpha_{UVNF}(x, y)$ is the UV combination ratio of the selected image at coordinate (x, y), $Y_F(x, y)$ is the luminance value of the selected image, $Y_{NF}(x, y)$ is the luminance value of the addition average image, "a" and "b" are shown setting the slope ($a_F$, $a_{NF}$) of the point-addition function b−a>0.5 such that the UV weighting of the addition average image is 1.0 where the selected image and the addition average image both approach saturation.

From the formula and FIG. 13 the following consequences arise.

1. When only the luminance of the selected image approaches the saturated region, the UV weighting of the selected image is more heavily weighted.

2. When only the luminance of the addition average image approaches the saturated region, the UV weighting of the selected image is more heavily weighed.

3. When the luminance of both the selected image and the addition average image approach saturated regions, there is a high probability of direct image capture with a light source other than flash, and the UV weighting of the addition average image is more heavily weighed such that the UV of the WB shifted selected image is not applied.

4. When the luminance of both the selected image and the addition average image are lower than the central value, addition averaging is at the ratio 1:1.5. When the luminance of both the selected image and the addition average image are just slightly higher than the central value, the UV weighting of the selected image is more heavily weighted. This done so that the change in color of the flash image of the face or the like due to color mixing in a high luminance region does not stand out.

Figure 14:
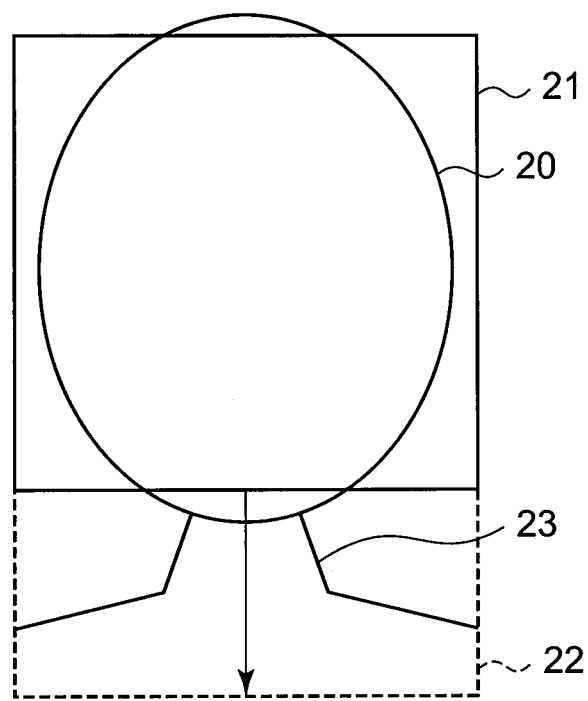
FIG. 14 is a diagram showing modification of a face frame.

Face image detection is then performed on the selected image (step H2). In step H2, when a face image is detected in the selected image, as shown in FIG. 14, a face frame 21 is set so as to surround the face portion of a face image 20, and the portion inside the face frame 21 is identified as the face image 20.

Then the frame identifying where a face image is detected is extended in the vertical direction such that a neck image portion below the face image is included (step H3). By the processing of step H3, the face frame 21 is extended in the vertical direction with the addition of the extension portion 22 shown by the broken line in FIG. 14. The face frame 21 thereby not only includes the face image 20 but also a neck image 23, this being a skin colored region of a portion below the face image 20.

At the inside of the extended face frame 21, point addition is performed of an α value whose value increases as the distance from the face frame 21 gets greater (namely on getting nearer to the center of the face frame 21) (step H4). Subsequently, the UV of the selected image and the addition average image are then combined based on the α map for UV combination generated at step H1 (step H5).

The processing of step G1 in the flow chart of FIG. 11 is thereby completed. Then the steps G2 to G6 are executed by processing similar to that of the steps F1 to F5 of FIG. 10 in the above second exemplary embodiment.

The combining processing of step E15 in the flow chart of FIG. 9 is thereby completed, and the image obtained at step G6 is saved on the external storage medium 11 as the final output image.

Consequently, according to the present exemplary embodiment, unnatural coloring can be prevented from standing out due to combination of the selected image (flash image) and the addition average image (non-flash image).

However, in the present exemplary embodiment, due to performing luminance adjustment on the face image, the face image can be prevented from standing out as an unnatural coloring standing due to combination of the selected image (flash image) and the addition average image (non-flash image).

In addition, due to luminance adjustment being performed not just for the face image but so as to include the neck image below the face image, in the skin colored region including the face image of the human subject, unnatural coloring can be prevented from standing out due to combination of the selected image (flash image) and the addition average image (non-flash image) can be prevented.

In step G1, UV weighted addition processing is performed so as to be based on both the luminance of the selected image and the luminance of the addition average image. However, configuration may be made such that UV weighted addition processing is performed so as to be based on one or other of the luminance of the selected image or the luminance of the addition average image alone. Unnatural coloring can be prevented from standing out due to combination of the selected image (flash image) and the addition average image (non-flash image) in such cases too.

In cases where the luminance of the addition average image (non-flash image) is of such a high level so as to approach saturation, configuration may be made so as to compute the white balance of the flash image to match the flash image without reducing the weighting of the selected image (flash image).

Although the embodiments according to the present invention have been described above, the present invention may not be limited to the above-mentioned embodiments but can be variously modified. Components disclosed in the aforementioned embodiments may be combined suitably to form various modifications. For example, some of all components disclosed in the embodiments may be removed or may be appropriately combined.

Additional advantages and modifications will readily occur to those skilled in the art. Therefore, the invention in its broader aspects may not be limited to the specific details and representative embodiments shown and described herein. Accordingly, various modifications may be made without departing from the spirit or scope of the general inventive concept as defined by the appended claims and their equivalents.

What is claimed is:

1. An image capture apparatus comprising:
   an image capturing unit;
   a light emitting unit;
   a first image capture controller configured to control the image capturing unit to capture a plurality of images at a first timing;
   a second image capture controller configured to control the image capturing unit to capture a plurality of images under a capturing condition illuminated by the light emitting unit at a second timing that is either directly before or directly after the first timing;

an addition combination section configured to positionally align the images captured under control by the first image capture controller and to perform an addition combination on the aligned images to generate a combined image;

a selector configured to evaluate a face image included in the images captured under control by the second image capture controller and to select one of the images most highly evaluated as a selected image;

a determination section configured to perform positional alignment between an image selected by the selector and the plurality of images captured under control by the first image capture controller, and to determine whether or not the images substantially match with each other; and a combination section configured to combine the combined image generated by the addition combination section with an image captured under control by the second image capture controller;

wherein the selector selects the image most highly evaluated, when the determination section determines that there is a substantial match;

wherein the selector selects an image captured under control by the second image capture controller at a timing nearest to the first timing, when the determination section determines that there is no substantial match; and wherein the combination section is configured to combine the combined image with the selected image.

2. The image capture apparatus of claim 1, further comprising a white balance adjustment section configured to adjust at least one of a white balance of the combined image and a white balance of the images captured under control by the second image capture controller so as to match with each another.

3. The image capture apparatus of claim 1, further comprising a correction processing section configured to perform γ correction on the combined image prior to performing the combination by the combination section.

4. The image capture apparatus of claim 1, further comprising a luminance adjustment section configured to adjust a luminance of at least one of the combined image and the images captured under control by the second image capture controller, prior to performing the combination by the combination section.

5. The image capture apparatus of claim 4, further comprising:

a face image detection section configured to detect a face image included in at least one of the combined image and the images captured under control by the second image capture controller, wherein the luminance adjustment section is configured to adjust a degree of the adjustment of the luminance based on a skin colored region containing the face image detected by the face image detection section.

6. An image capturing method comprising:

controlling an image capturing unit to capture a plurality of images at a first timing;

controlling the image capturing unit to capture a plurality of images under a capturing condition illuminated by a light emitting unit at a second timing that is either directly before or directly after the first timing;

positionally aligning the images captured at the first timing and performing an addition combination on the aligned images to generate a combined image;

evaluating a face image included in the images captured under the capturing condition illuminated by the light emitting unit at the second timing, and selecting one of the images most highly evaluated as a selected image;

Performing positional alignment between a selected image and the plurality of images captured at the first timing, and determining whether or not the images substantially match with each other; and combining the combined image with an image captured under the capturing condition illuminated by the light emitting unit at the second timing;

wherein, when the determining determines that there is a substantial match, the most highly evaluated image is selected as the selected image;

wherein, when the determining determines that there is no substantial match, an image captured under the capturing condition illuminated by the light emitting unit at a timing nearest to the first timing is selected as the selected image; and wherein the combining comprises combining the generated combined image with the selected image.

7. A non-transitory computer readable recording medium having a program stored thereon for controlling a computer of an image capture apparatus comprising an image capturing unit and a light emitting unit to perform functions comprising:

controlling the image capturing unit to capture a plurality of images at a first timing;

controlling the image capturing unit to capture a plurality of images under a capturing condition illuminated by the light emitting unit at a second timing that is either directly before or directly after the first timing;

positionally aligning the images captured at the first timing and performing an addition combination on the aligned images to generate a combined image;

evaluating a face image included in the images captured under the capturing condition illuminated by the light emitting unit at the second timing, and selecting one of the images most highly evaluated as a selected image;

Performing positional alignment between a selected image and the plurality of images captured at the first timing, and determining whether or not the images substantially match with each other; and combining the generated combined image with an image captured under the capturing condition illuminated by the light emitting unit at the second timing;

wherein, when the determining determines that there is a substantial match, the most highly evaluated image is selected as the selected image;

wherein, when the determining determines that there is no substantial match, an image captured under the capturing condition illuminated by the light emitting unit at a timing nearest to the first timing is selected as the selected image; and wherein the combining comprises combining the generated combined image with the selected image.

* * * * *